Patented Sept. 6, 1938

2,128,985

UNITED STATES PATENT OFFICE 2,128,985

TREATMENT OF HEAVY OIL

William H. Carmody, Dayton, Ohio, assignor to The Neville Company, Pittsburgh, Pa., a corporation of Pennsylvania No Drawing. Application January 28, 1935, Serial No. 3,890

4 Claims. (Cl. 260—7)

This invention relates to treatment of heavy oil.

In the manufacture of coumarone-indene resin by the catalytic polymerization of the polymerizable bodies, chiefly coumarone and indene, found in crude solvent naphtha, and in equivalent polymerizable-containing liquids derived from coal, there is a tendency toward lack of uniformity in the stage of polymerization to which the bodies are brought. Whereas some processes of polymerization produce a coumarone-indene resin of substantially uniform polymerization throughout, other processes, desirable for particular reasons, tend to the production of a relatively great quantity of the lower polymers. After polymerization of the polymerizable bodies in crude solvent naphtha the polymers of coumarone and indene are recovered by distillation of the reaction mixture. There are distilled off, in the following order, unreacted coumarone and indene, solvent naphtha, and naphthalene, leaving a mixture of the higher polymers of coumarone and indene, which form hard resins, and the lower polymers, which do not solidify into hard resin but are of an oily nature. The distillation just referred to terminates at about 218° C. If the distillation be continued, which is usually accomplished by combined steam and vacuum, the lower polymers pass over with production of a product known as "heavy oil" which is composed chiefly of the dimers of the polymerizable bodies, with some inclusion of the trimers of those bodies.

Heavy oil, while potentially a product of substantial value for use as a plasticizer in coating compositions, and for other uses, possesses certain qualities and potentialities which normally detract greatly from its value. Thus it has a susceptibility to drying during a continued period of time, and to the development of acidity. Its drying tendency causes the heavy oil to lose its plasticizing value, and permits a coating film, in which it is included, to become dry and brittle. Heavy oil is highly colored by fulvene color bodies, and has a strong tendency, upon exposure to oxygen, which may be atmospheric oxygen, to form aldehydes. It is this aldehyde formation which promotes progressive discoloration of the heavy oil, and which leads to the tendency for a film, containing the heavy oil, to dry and to develop acidity.

It may be noted that the yellowing tendency in heavy oil is much more marked than is the yellowing tendency in hard coumarone-indene resin. This I have found to be due to the fact that it tends more rapidly, under the influence of oxygen, to form aldehydes, and thereby, in accordance with the mechanism hereinafter to be described, to form fulvenes in its body. The tendency of the heavy oil to dry, and to develop an increased acid number, is in part due to the fact that some aldehydes, as formed in the heavy oil, by contact with oxygen, lead to the production of acids rather than to fulvenation of the indene polymers. The mechanism of aldehyde formation as leading to yellowing, and as causing drying of the heavy oil will be hereinafter explained. Further, heavy oil, while stable for short periods of time, and substantially unaffected during short periods of time by the polymerization-promoting effect of catalysts, possesses a strong tendency to further polymerize under subjection to oxygen for extended periods of time.

Continued polymerization, by the building of relatively heavy resin molecules in a composition in which the heavy oil has been included as a plasticizer, naturally leads to the loss of that plasticizing effect for which the heavy oil was specifically included. This effect is contributed to by the fulvenation of indene dimers and trimers which increases the weight of these molecules by addition thereto. A corollary result of aldehyde formation in the heavy oil is a marked increase in its acid number. It is the fulvenation of the indene polymers which gives coloration to the heavy oil. Leaving the mechanism by which my effect is accomplished to follow hereinafter, the procedure which I follow in curing the above-noted defects in heavy oil may be set forth as follows:

The first step in my process consists in the selection or preparation of an efficient catalyst for the promotion of hydrogenation. The catalyst which I prefer is the one known as "Raney" nickel, which catalyst is obtained by the treatment of a nickel aluminum alloy to obtain pure nickel in sponge condition. As commercially available for the purpose, this nickel aluminum alloy comprises nickel and aluminum in substantially equal proportions. This alloy is introduced into a water solution of sodium hydroxide. The solution containing the alloy is boiled to complete reaction by which aluminum is dissolved, and is washed several times to obtain the pure nickel sponge remaining from solution of the aluminum content of the alloy. The water may then be eliminated from the catalyst by boiling in the presence of refined inert naphtha.

The catalyst is then introduced into the heavy oil. If desired, the heavy oil may be thinned by the addition of a suitable coal derivative solvent, such as refined high-flash naphtha, or may be warmed slightly to reduce its viscosity. I can, however, successfully treat heavy oil at normal room temperature, and without the use of a thinner. I have introduced into the heavy oil the above-noted catalyst in an equal proportion by weight with the heavy oil.

With the heavy oil and catalyst in a container, hydrogen is introduced to flush out all air, and establish a completely hydrogen atmosphere within the container. The heavy oil desirably is subjected to agitation in the presence of hydrogen.

My preferred procedure is to introduce hydrogen into the container continuously, to replace hydrogen taken up by the heavy oil under treatment, in order that hydrogenation may be carried to a point at which substantially all the molecules of the heavy oil have been affected.

It should be explained in connection with the treatment of heavy oil, as distinguished from the hydrogenation of hard coumarone-indene resin, or the hydrogenation of still residue, or of cyclopentadiene resin, that the hydrogenation of heavy oil should be as complete as possible, in the sense that all, or substantially all, the individual polymers are to be hydrogenated to a restricted extent explained more in detail hereinafter. This is for the reason that heavy oil, comprising the lower polymers of indene, is particularly reactive, and because there are per unit volume a greater number of molecules in the heavy oil, as compared with hard resin, which are capable of aldehyde and fulvene development. A substantial margin of unaffected molecules in the heavy oil, therefore, leaves the heavy oil susceptible to noticeable coloration, and also leaves the heavy oil susceptible, to a marked extent, to the drying effect and acidification resulting from the action of oxygen on the heavy oil.

I have found a relatively short period of treatment adequate to effect my desired hydrogenation under normal atmospheric pressure. If it be desired to expedite the reaction, moderate superatmospheric pressure may be employed. I prefer to utilize a pressure which is not greatly in excess of atmospheric pressure, since elevated pressure is not essential to the hydrogenation, as desired, and as performed, by me. It may be stated generally that the only requisites to adequate hydrogenation of heavy oil, in my desired manner are an adequate supply of hydrogen in the presence of a suitable catalyst, and a sufficient time period of treatment to permit hydrogenation to take place. The reason for the facility with which heavy oil may be hydrogenated adequately for my purpose will be hereinafter explained with relation to the molecular structure of indene and coumarone polymers in the heavy oil, and the nature of the modification in the polymers, which I have found adequate, to prevent the several undesirable effects in the heavy oil which have been noted above. It should be explained that pressure and catalyst efficiency constitute, in my process, an inverse relationship; and that when I state that high pressure is unnecessary, it is to be understood that low pressure should desirably be coupled, in my process, with an adequate quantity of an efficient catalyst, such as the "Raney" catalyst, above described, in order that hydrogenation may proceed with relatively great rapidity.

After the hydrogenating treatment has continued for an adequate period of time, the heavy oil is separated from the catalyst in any convenient manner. If the heavy oil has been thinned by means of a solvent, such solvent is distilled off. The heavy oil resulting from a moderate hydrogenating treatment, such as that described, is colorless, or substantially colorless. It is stable under oxidizing conditions such as that established by atmospheric exposure, so that it does not form within its body aldehydes leading either to coloration by the development of fulvene, or to an increase in acid number. Further, the heavy oil has been stabilized as against gradual, progressive polymerization.

Assuming, as is a fact, that heavy oil is composed in substantial entirety of the lower polymers of coumarone and indene, it is these polymers which must be so saturated as to cure the potentiality of heavy oil to develop undesirable characteristics. Coumarone, as considered by itself, is not susceptible to yellowing, although it may, under reaction with oxygen, become aldehydic. Insofar as the yellowing quality of heavy oil is concerned, it is the indene polymer which I seek so to modify as to prevent the occurrence of, or to cure, yellowing. In my co-pending application Serial No. 1897, filed January 15, 1935, dealing with the production of non-yellowing coumarone-indene resin, and my co-pending application Serial No. 3291 filed January 24, 1935, dealing with the treatment of still residue, I have, therefore, been concerned only with the indene polymer. This is for the reason that it alone yellows, and that treatment of the indene polymer to prevent its yellowing, obviates any tendency in this direction to which the coumarone polymer might, because of its oxidation into aldehydic form, contribute.

It is a fact, however, that the same hydrogenating treatment, which leads to a modification in the indene polymer by saturation similarly leads to a saturation of the coumarone polymer at corresponding points in the molecular structure of the two polymers.

As described in my aforesaid copending application Serial No. 3,291, such hydrogenation may be effected at normal temperature and pressure, or at moderately elevated temperatures and pressures, say at a temperature not greatly in excess of 150° C., and at a pressure not greatly in excess of 5 to 6 atmospheres. The chief effect of, say, increased temperature is that known to result from it, viz., to increase the speed of hydrogenation and thus to be economically advantageous as long as the temperature is below that at which cracking of the polymers occurs.

Although it is roughly estimated that hard coumarone-indene resin comprises approximately 90% indene polymers to 10% coumarone polymers, it is probable that there are present in heavy oil a greatly increased proportion of the lower polymers of coumarone, as compared with lower polymers of indene. This is for the reason that coumarone is the more difficultly polymerizable of the two polymerizable materials. In the case of heavy oil, it is of importance that the coumarone polymers also be individually saturated. This is for the reason that the stability of the heavy oil as against a tendency to form aldehydes, and against a tendency to progressive polymerization, is an end in itself, aside from the question of fulvene coloration in the heavy oil. While in hard resin there is but little tendency toward further polymerization, or toward the development of acidity, these tendencies are, as have been explained, present to a high degree in heavy oil comprising the lower, and more reactive polymers.

Below I give illustrative formulae of a coumarone dimer, and an indene dimer, in accordance with a molecular condition which I have predicated for polymers of these substances, and which in the case of indene polymers I have proven:

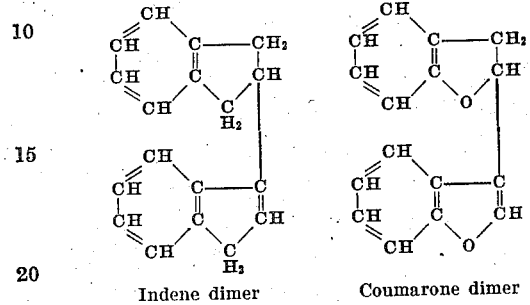

Indene dimer    Coumarone dimer

It will be noted in the above formulae that in one unit, both of coumarone and of indene, which in each case we shall consider as the terminal unit, there is a point of unsaturation, represented in each formula by a double bond, outside the aromatic nucleus of the unit. This is clearly to be considered the point, structurally considered, at which oxygen may enter into the molecules to modify their molecular structure.

With relation to the prevention and cure of yellowing, we shall consider the indene polymer only. Under the influence of aldehydes and ketones, there is an introduction of oxygen into the structure of the terminal indene unit, with consequent formation and elimination of water. Upon consideration of the manner in which such reaction proceeds, it will be realized that the reaction between the terminal unit of the indene polymer and an aldehyde or ketone causes this terminal indene unit to assume the structure of a fulvene. That is, if we consider a portion of the aromatic nucleus of the unit visually, we have a cyclopentadiene ring, which is capable of reaction with an aldehyde or ketone to produce a fulvene. As the reaction occurs wholly outside the aromatic nucleus, the fact that the cyclopentadiene ring structurally includes a portion of the aromatic nucleus, is of no moment. It is this fulvenation of the indene polymer, at its terminal unit, which causes coloration of the resin. The reaction by which this coloration takes place may be illustrated by the following formula:

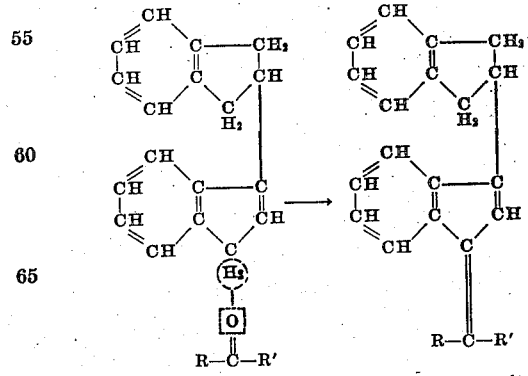

Fulvene development at terminal indene unit

Usually, in the reaction graphically represented above, R and R' represent hydrogen, or "alkyl," or "aryl," radical, depending upon the particular aldehyde or ketone entering into the reaction. R or R' might, however, represent an oxidized indene or coumarone molecule, having aldehyde or ketone properties, but which is perhaps not properly defined by the terms "aryl" or "alkyl."

Considering the phenomenon of after-yellowing, which would consist in the development of color, or the intensification of color, in the heavy oil itself, or in the heavy oil as mixed with other ingredients of coating compositions, it is interesting to visualize the manner in which the presence of aldehydes leads to the development of fulvenes. If we assume that the heavy oil is included in a coating composition, there are present in the composition, in the form of drying oils and other ingredients, aldehydes and/or ketones capable of entering into reaction with the terminal unit of the individual indene polymers to fulvenate the indene polymers, and thereby produce fulvene color bodies. If, however, the heavy oil is unmixed with other materials, after-yellowing none the less occurs, although at a slow rate. The mere action of oxygen on the indene polymers, without any consequent train of reaction in the heavy oil, would not lead to the production of fulvene. It becomes clear, however, upon considering the mechanism of after-yellowing, that the effect of oxygen is primarily to so modify indene and coumarone polymers as to give them aldehydic properties. In the phenomenon of after-yellowing, such action is, of course, gradual and progressive, individual indene and coumarone polymers being progressively modified by oxygen, under oxidizing atmospheric conditions, and progressively reacted with other unoxidized polymers to produce fulvene color structures.

The oxidized, that is, aldehydic, indene or coumarone molecules might theoretically be monomers, but in the heavy oil, as also in solid coumarone-indene resin, they are, of course, polymers, being in the heavy oil the lower polymers of coumarone and indene. The effect of oxygen upon the terminal unit of an indene polymer cannot be stated structurally as a proven reaction. While I do not wish to be tied to the following hypothetical formulae, illustrative of such oxidation, of coumarone and indene polymers, the progress of reaction, as illustrated by them, is in all probability correct, and is consistent with observed effects:

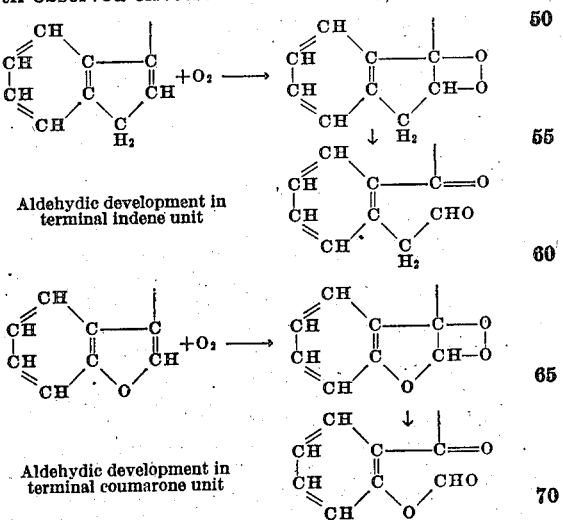

Aldehydic development in terminal indene unit

Aldehydic development in terminal coumarone unit

We thus have both indene and coumarone units, which have been so modified as to be capable of entering into fulvene development at the terminal unit of unoxidized indene polymers.

The coumarone polymer, which has beeen rendered aldehydic by oxidation, is capable, in the body of heavy oil, of reactions other than the reaction producing fulvene development of an indene polymer. Thus, this coumarone polymer is, in its terminal unit, capable of further oxidation to form an acid derivative of coumarone.

It will be noted from the above formulae that the peroxide development in both the coumarone and indene molecules is unstable. It may lead to polymerization as well as to the development of aldehydes illustrated in the formulae.

The facts that heavy oil develops drying tendencies, and develops a progressively increasing acid number, have long been noted. Quite obviously the drying qualities may be due both to polymerization and to the formation of aldehydes in the heavy oil. As to the accretion of acidity in the heavy oil, the most reasonable explanation is continued oxidation of aldehyde formed from the coumarone into acid derivative of the coumarone. This apparently is borne out by the fact that my method of saturation, by hydrogenation, prevents increase in the acid number of the heavy oil.

The following formula illustrates the manner in which an oxidation product of the coumarone polymer, reacting as an aldehyde, produces a fulvene development at the terminal unit of an indene polymer:

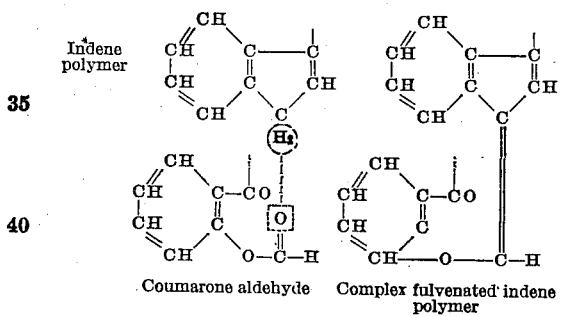

Coumarone aldehyde    Complex fulvenated indene polymer

It will be noted by comparison with the general formula for fulvene development given above, that this formula illustrates the coumarone-derived aldehyde as the "R" of the formula, and hydrogen as the "R'" of the formula.

The following formula illustrates the oxidation of the aldehyde derivative of coumarone into an acid derivative of coumarone:

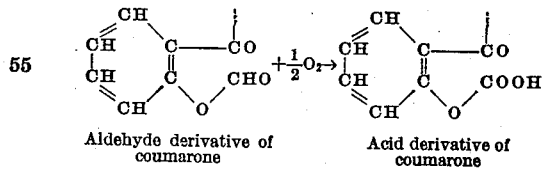

Aldehyde derivative of coumarone    Acid derivative of coumarone

It will be noted that this may occur through a continued gentle oxidizing effect such as that produced by atmospheric oxygen. The fact that it is a gentle oxidation may, in all probability, account for the fact that the two reactions illustrated immediately above, namely, the fulvene development by reaction with an indene polymer, and the further oxidation of the aldehyde derivative of coumarone into an acid derivative, may simultaneously proceed.

Theoretically, both these reactions might take place in hard coumarone-indene resin, comprising the higher polymers of indene and coumarone, and it may be that the oxidation of the coumarone aldehyde to an acid derivative of coumarone does to some slight extent take place in the hard resin. It can be stated positively that such reaction is of but slight importance in solid coumarone-indene resin, however, for the reason that in the hard resin the coumarone polymers are present in much smaller proportion with respect to the indene polymers, and because the higher polymers present greater stability. Thus, in hard coumarone-indene resin the fulvenation of the indene polymers, by the phenomenon of after-yellowing in a pure film of the resin, is probably effected chiefly by aldehyde derivatives of indene polymers reacting with other, unoxidized, indene polymers.

To return to the process of hydrogenation, and to explain how hydrogenation prevents the illustrated train of reactions, it has been previously noted that the requisite hydrogenation effected by me is moderate. It is a fact that in heavy oil substantially all the individual polymers of coumarone and indene should be affected by the hydrogenation, and in this sense it may be considered that the hydrogenation is complete, rather than moderate. However, as explained herein, the benefits of the invention are derived primarily from saturation of the cyclopentadiene ring of the terminal unit of the indene polymers, which is accompanied by hydrogenation of the furan ring of the terminal unit of the coumarone polymers, while commensurate hydrogenation of their aromatic rings is unnecessary. It is to such restriction of hydrogenation that the word "moderate" is applied herein, i. e., to the extent of hydrogenation in the terminal unit of each individual polymer.

By the gentle hydrogenation, that is, hydrogenation under moderate temperature and pressure, hydrogen is introduced into the indene polymer and the coumarone polymer, in the cyclopentadiene structure of the terminal unit of each of the polymers, thus:

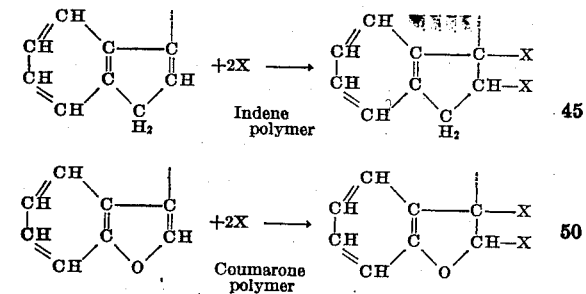

In these formulae it will be observed that what has been done is to change the double bond of the cyclopentadiene structure, which is without the aromatic nucleus in the terminal unit of each of the polymers, by addition at the carbon atoms previously linked by a double bond. This having been effected, it becomes impossible, by reaction with aldehydes or ketones, to develop the fulvene structure at the terminal unit of either polymer. The resistance of the saturated terminal unit to such action is limited only by the stability of the addition which has been made.

In my practice the "X" of the formulae represents hydrogen, and by hydrogenation a saturation of great stability is obtained. It is possible that other values may be ascribed to "X" with adequate results. Thus, it is possible that in each formula, one or both of the "Xs" may prove suitably to represent an acetate radical.

By considering the illustrative formulae given above, it will be at once apparent why a moderate hydrogenation is able to effect a substantially complete saturation of the coumarone and indene polymers of the heavy oil numerically considered. I have illustrated a hydrogenation in which the hydrogen has been introduced at the point in the molecular structure of the polymers which is most readily available for that purpose. Since it is unnecessary for my purpose to introduce hydrogen into the aromatic nucleus of any unit of the polymers, what might be considered a forced hydrogenation becomes unnecessary. Even though the addition of hydrogen into the aromatic nucleus of the dimers and trimers constituting heavy oil would not be substantially disadvantageous, there is great commercial advantage in conducting hydrogenation under moderate temperature and pressure conditions.

There are several modes of observing completion of the hydrogenation to the point at which this specific double bond, in substantially all individual polymers, has been saturated. All of such modes of observation are well-known in the art, but the simplest mode of noting completion of the hydrogenation may here be noted: Such mode is to place a pressure gauge on the vessel containing the resinous material for hydrogenation, and into which hydrogen is passed under pressure. If hydrogen be introduced into the treating vessel at a constant pressure, a gauge on the treating vessel will, at the beginning of the process, indicate a pressure substantially lower than the pressure at which the hydrogen is introduced. This indicated pressure at the treating vessel will gradually rise as the unsaturation of the material decreases, until at the completion of the reaction there will be a relatively abrupt rise in pressure, due to the saturation at the indicated point of substantially all the individual polymers, leaving for further possible saturation only structural points of the polymers at which saturation is difficult to effect.

The above relates to the saturation of polymers which are assumed to be existent in the heavy oil in unoxidized and unfulvenated condition. The action upon the fulvenated polymers is similar, save that the fulvene structure at the terminal unit of each of the polymers provides an additional point at which hydrogenation may readily be effected. This is the double bond, shown structurally as linking the appendant group derived from the aldehyde or ketone addition to produce in the polymer a fulvene structure.

The fulvene structure developed in the coumarone or indene polymers being once destroyed, by saturation at either the noted double bond in the cyclopentadiene structure, or at the structurally appendant bond, a molecule cannot become again fulvenated. As to the formation of peroxide, leading to the production of aldehydic structures, and tending to promote polymerization or result in an increase in acid number, such effects are inhibited by saturation at the noted double bond in the cyclopentadiene structure of the terminal unit. Hydrogenation of already fulvenated heavy oil, if carried out to a reasonable point, results in saturation in the cyclopentadiene structure, whether or no saturation be also effected at the structurally appendant double bond. The treatment of already colored heavy oil, to decolorize it, and prevent future coloration by fulvene development, results additionally, therefore, in preventing drying of the heavy oil, and increase in its acid number. In this connection it may be noted that the initial decoloration of a heavy oil under hydrogenating treatment cannot be taken as a criterion, to show that hydrogenation, adequate for my purpose, has been effected.

I claim as my invention:

1. The herein described method of treating heavy oil comprising lower polymers of coumarone and indene and recovered separately from the more highly polymerized coumarone-indene bodies produced by polymerization of the polymerizable bodies in crude solvent naphtha, in which heavy oil a cyclopentadiene structure is present in the terminal unit of indene polymers, to eliminate a double bond outside the aromatic ring in said terminal units and thereby to stabilize the terminal units of the indene polymers against reactions resulting in color formation in said heavy oil, which method comprises subjecting said heavy oil as a sole substance susceptible to hydrogenation to gaseous hydrogen in the presence of an active nickel hydrogenation catalyst for hydrocarbons and with agitation under conditions of temperature and pressure such as to effect saturation of the double bond of said terminal unit cyclopentadiene structure throughout substantially the entire body of said heavy oil without commensurate introduction of hydrogen into the aromatic rings of said terminal units.

2. The herein described method of treating heavy oil comprising lower polymers of coumarone and indene and recovered separately from the more highly polymerized coumarone-indene bodies produced by polymerization of the polymerizable bodies in crude solvent naphtha, in which heavy oil a cyclopentadiene structure is present in the terminal unit of indene polymers, to eliminate a double bond outside the aromatic ring in said terminal units and thereby to stabilize the terminal units of the indene polymers against reactions resulting in color formation in said heavy oil, which method comprises subjecting said heavy oil as the sole substance susceptible to hydrogenation to gaseous hydrogen in the presence of an active nickel hydrogenation catalyst for hydrocarbons and with agitation under conditions of moderately elevated temperature and pressure such as to effect saturation of the double bond of said terminal unit cyclopentadiene structure throughout substantially the entire body of said heavy oil without commensurate introduction of hydrogen into the aromatic rings of said terminal units.

3. The herein described method of treating heavy oil comprising lower polymers of coumarone and indene and recovered separately from the more highly polymerized coumarone-indene bodies produced by polymerization of the polymerizable bodies in crude solvent naphtha, in which heavy oil a cyclopentadiene structure is present in the terminal unit of indene polymers, to eliminate a double bond outside the aromatic ring in said terminal units and thereby to stabilize the terminal units of the indene polymers against reactions resulting in color formation in said heavy oil, which method comprises subjecting said heavy oil as the sole substance susceptible to hydrogenation to gaseous hydrogen in the presence of an active nickel hydrogenation catalyst for hydrocarbons and with agitation under a temperature of not substantially in excess of about 150° C. and a pressure not substantially in excess of 5 to 6 atmospheres to effect hydrogenation of the double bond of said terminal unit cyclopentadiene structure throughout substantially the entire body of said heavy oil without commensurate introduction of hydrogen into the aromatic rings of said terminal units.

4. As a new article of manufacture, hydrogenated heavy oil comprising the lower polymers of coumarone and indene recovered separately from the more highly polymerized coumarone-indene bodies after polymerization of the polymerizable bodies in crude solvent naphtha, said heavy oil being hydrogenated and being characterized by being permanently approximately colorless, by having substantially the entire body of the lower indene polymers saturated by hydrogen in the cyclopentadiene ring of the terminal unit of each polymer and by having no commensurate hydrogenation of the aromatic rings of such units.

WILLIAM H. CARMODY.